UNITED STATES PATENT OFFICE.

JEREMIAH H. HASCALL, OF CORUNNA, MICHIGAN.

IMPROVED MEDICINE FOR MIASMATIC DISEASES.

Specification forming part of Letters Patent No. 35,022, dated April 22, 1862.

*To all whom it may concern:*

Be it known that I, JEREMIAH H. HASCALL, of Corunna, in the county of Shiawassee and State of Michigan, have invented a new composition of matter, denominated "The Solid and Fluid Extract of the Bark of the Black and White Ash Tree," a specific for miasmatic diseases, of which the following is a specification.

The nature of my invention consists in the preparation of said extracts, and the employment of it in the treatment of such diseases, particularly fever and ague.

To enable others to make and use my invention, I proceed to describe the mode of preparing said extracts.

*Fluid extract.*—Take of the bark of the white or black ash, ground to a moderately-fine powder, sixteen ounces, troy; diluted alcohol, *quantum sufficit;* sugar, ten ounces. Moisten the bark with one-half pint diluted alcohol. Let it stand one-half hour. Pack in a percolator firmly, cover it with a disk of cloth, and gradually add the diluted alcohol until three pints of tincture have passed. Evaporate the tincture by a water bath to one pint. Add the sugar, continue the evaporation until the fluid measures one pint, and strain while hot. One ounce of the powdered bark is represented by one fluid ounce of the liquid.

*Solid extract.*—Place the bark in a kettle with cold water sufficient to cover it. Boil for two hours. Pour off the liquid, and add the same quantity of cold water. Boil for two hours. Pour off and add as before, and boil a third time. Then throw away the residuum of bark. Pour all the liquid together, strain, and boil slowly until a solid of proper consistency is reached.

*In what way and quantity the compound may be used.*—In all malarious fevers, fever and ague, chill-fever, intermittent and remittent fevers I prescribe a four-grain pill of the solid extract hourly until the fever is broken up. In case the fluid extract is employed, I prescribe a teaspoonful once in two hours. Either extract may be employed with equal advantage and with the same beneficial effect, whether fever exists or not.

What I claim as my invention, and desire to secure by Letters Patent, is—

The composition made of the material substantially as described, and for the purpose set forth.

JEREMIAH H. HASCALL.

Witnesses:
JOHN CARLAND,
JEROME W. TURNER.